(12) United States Patent  
You et al.

(10) Patent No.: US 7,830,485 B2  
(45) Date of Patent: Nov. 9, 2010

(54) LIQUID CRYSTAL DISPLAY PANEL HAVING FIRST AND SECOND SETS OF PIXEL AND COMMON ELECTRODES ON RESPECTIVELY OPPOSED FACING SUBSTRATES WITH BLUE PHASE LIQUID CRYSTALS IN WHICH AN ANISOTROPIC REFRACTIVE INDEX THEREOF VARIES BY FIRST AND SECOND ELECTRIC FIELDS RESPECTIVELY ADJACENT THERETO

(75) Inventors: Hye-Ran You, Yongin-si (KR); Seung-Hoo Joo, Seongnam-si (KR); Sung-Min Kang, Seoul (KR); Hee-Wook Do, Cheonan-si (KR); Hoon Kim, Ansan-si (KR); Hyun-Cheol Moon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 313 days.

(21) Appl. No.: 11/932,300

(22) Filed: Oct. 31, 2007

(65) Prior Publication Data

US 2008/0129901 A1 Jun. 5, 2008

(30) Foreign Application Priority Data

Dec. 4, 2006 (KR) .................. 10-2006-0121674

(51) Int. Cl.
*G02F 1/1343* (2006.01)
(52) U.S. Cl. ...................................... 349/141
(58) Field of Classification Search ............ 349/141
See application file for complete search history.

(56) References Cited

U.S. PATENT DOCUMENTS 7,113,243 B2 * 9/2006 Jeong et al. .............. 349/141
2006/0203169 A1 * 9/2006 Ozawa et al. ............ 349/141
2007/0085958 A1 * 4/2007 Lin et al. .................. 349/141

FOREIGN PATENT DOCUMENTS

CN 1828373 A 9/2006

* cited by examiner

*Primary Examiner*—John Heyman  
(74) *Attorney, Agent, or Firm*—Innovation Counsel LLP (57) ABSTRACT

In a liquid crystal display panel including an array substrate having a first pixel electrode and a first common electrode, and an opposite substrate facing the array substrate, the opposite substrate including a second pixel electrode and a second common electrode. A liquid crystal layer is interposed between the array substrate and the opposite substrate. Electric fields are formed between the first pixel electrode and the first common electrode and between the second pixel electrode and the second common electrode, respectively.

15 Claims, 6 Drawing Sheets

LIQUID CRYSTAL DISPLAY PANEL HAVING FIRST AND SECOND SETS OF PIXEL AND COMMON ELECTRODES ON RESPECTIVELY OPPOSED FACING SUBSTRATES WITH BLUE PHASE LIQUID CRYSTALS IN WHICH AN ANISOTROPIC REFRACTIVE INDEX THEREOF VARIES BY FIRST AND SECOND ELECTRIC FIELDS RESPECTIVELY ADJACENT THERETO

CROSS-REFERENCE TO RELATED APPLICATION

This application claims priority to and the benefit of Korean Patent Application No. 10-2006-121674 filed on Dec. 4, 2006 in the Korean Intellectual Property Office, the entire contents of which are incorporated herein by reference.

BACKGROUND OF THE INVENTION

1. Field of the Invention

The present invention relates to a liquid crystal display panel. More particularly, the present invention relates to a liquid crystal display panel having a high response speed.

2. Description of the Related Art

In general, a liquid crystal display includes a liquid crystal display panel displaying an image and a backlight assembly supplying a light to the liquid crystal display panel.

The liquid crystal display panel includes an array substrate, an opposite substrate facing the array substrate and a liquid crystal layer interposed between the array substrate and the opposite substrate. The array substrate includes a pixel electrode, and the opposite substrate includes a common electrode facing the pixel electrode.

Various liquid crystals, such as a nematic liquid crystal, a smetic liquid crystal, and a cholesteric liquid crystal, are used in the liquid crystal display panels. The nematic-type liquid crystal material is widely used in liquid crystal display panels. A tilt angle of the nematic liquid crystal is controlled by an electric field formed between the pixel electrode and the common electrode, and a light transmittance of the liquid crystal layer is controlled according to the tilt angle of the nematic liquid crystal. Also, the brightness of the liquid crystal display panel using nematic liquid crystal material depends on the thickness of the liquid crystal layer, i.e. a cell-gap of the liquid crystal display panel and an anisotropic refractive index of the liquid crystal. Therefore, in order to improve brightness and viewing angle of a liquid crystal display panel, a uniform cell-gap of the liquid crystal display panel and an isotropic refractive index of the liquid crystal are required.

Recently, in order to prevent a deterioration in the viewing angle and overcome a cell-gap dependency, a liquid crystal display panel having a blue-phase liquid crystal has been suggested. A liquid crystal display panel having a blue-phase liquid crystal is disclosed in U.S. Pat. No. 4,767,194. The blue-phase liquid crystal has a characteristic where an anisotropic refractive index is changed into an isotropic refractive index in accordance with the level of a voltage applied thereto. Thus, the blue-phase liquid crystal improves the viewing angle and provides increased response speed of the liquid crystal display panel. However, a liquid crystal display panel using a blue-phase liquid crystal requires a high driving voltage.

SUMMARY OF THE INVENTION

The present invention provides a liquid crystal display panel capable of reducing a driving voltage thereof.

In one aspect of the present invention, a liquid crystal display panel includes an array substrate, an opposite substrate, and a liquid crystal layer.

The array substrate includes a first base substrate, a first pixel electrode, and a first common electrode. At least one pixel area in which an image is displayed is defined on the first base substrate in an array configuration. The pixel electrode is arranged in the pixel area and receives a pixel voltage. The first common electrode is arranged in the pixel area and spaced apart from the first pixel electrode. The first common electrode receives a common voltage. The opposite substrate includes a second base substrate, a second pixel electrode, and a second common electrode. The second base substrate faces the first base substrate. The second pixel electrode is arranged on the second base substrate corresponding to the pixel area and receives the pixel voltage. The second common electrode is arranged on the second base substrate corresponding to the pixel area and spaced apart from the second pixel electrode. Also, the second common electrode receives the common voltage. The liquid crystal layer is interposed between the array substrate and the opposite substrate.

In addition, the liquid crystal display panel further includes a conductive spacer interposed between the first pixel electrode and the second pixel electrode to electrically connect the first pixel electrode to the second pixel electrode.

The liquid crystal layer includes blue-phase liquid crystals.

According to the above, Two pairs electrodes controlling the liquid crystal layer are arranged on the array substrate and the opposite substrate, respectively. Thus, an electric field that controls the liquid crystal layer is formed in uniform intensity between the array substrate and the opposite substrate.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an embodiment of the present invention is explained in detail with reference to the accompanying drawings.

Figure 1:
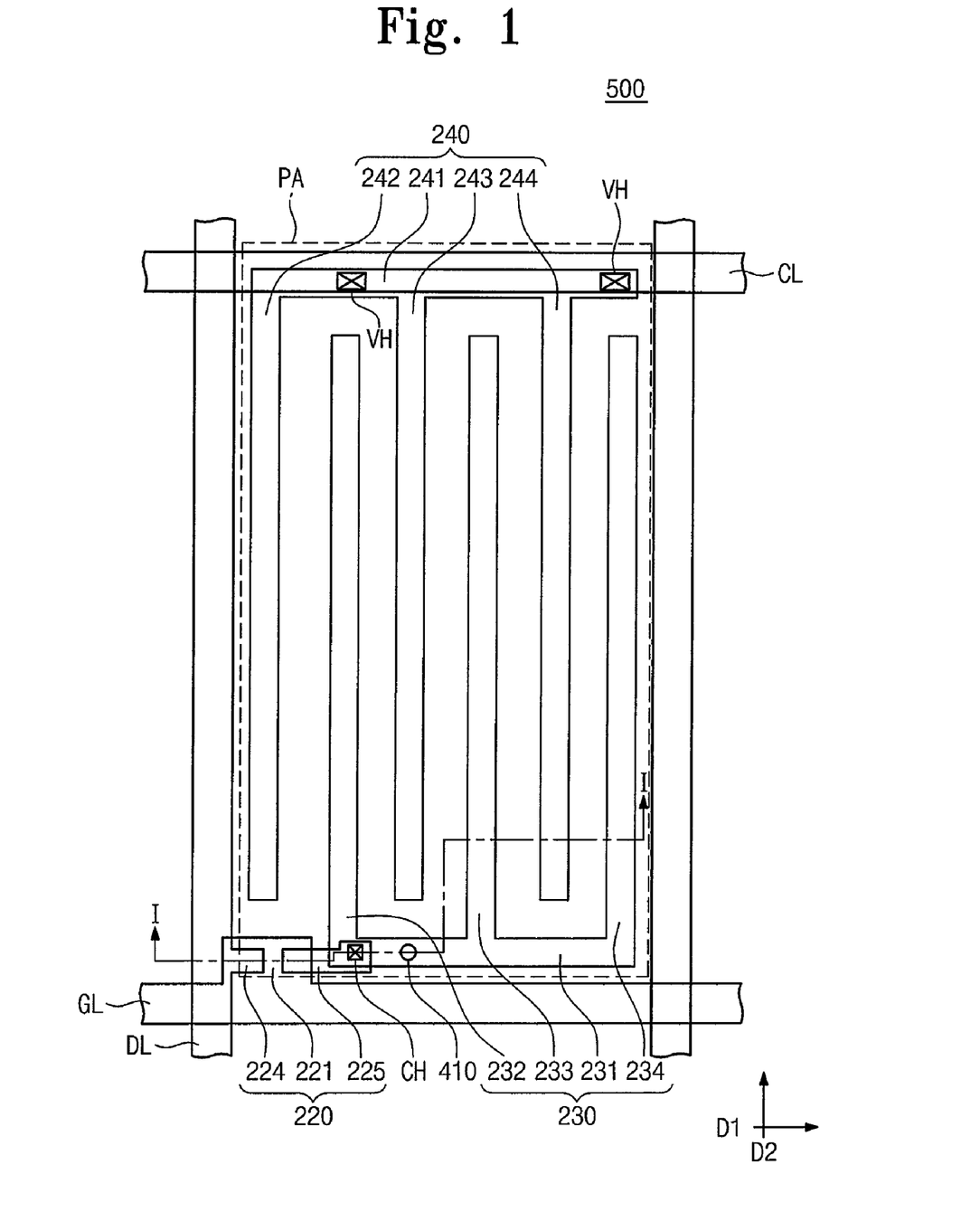
FIG. 1 is a plan view showing an exemplary embodiment of a liquid crystal display panel according to an embodiment of the present invention.
Figure 2:
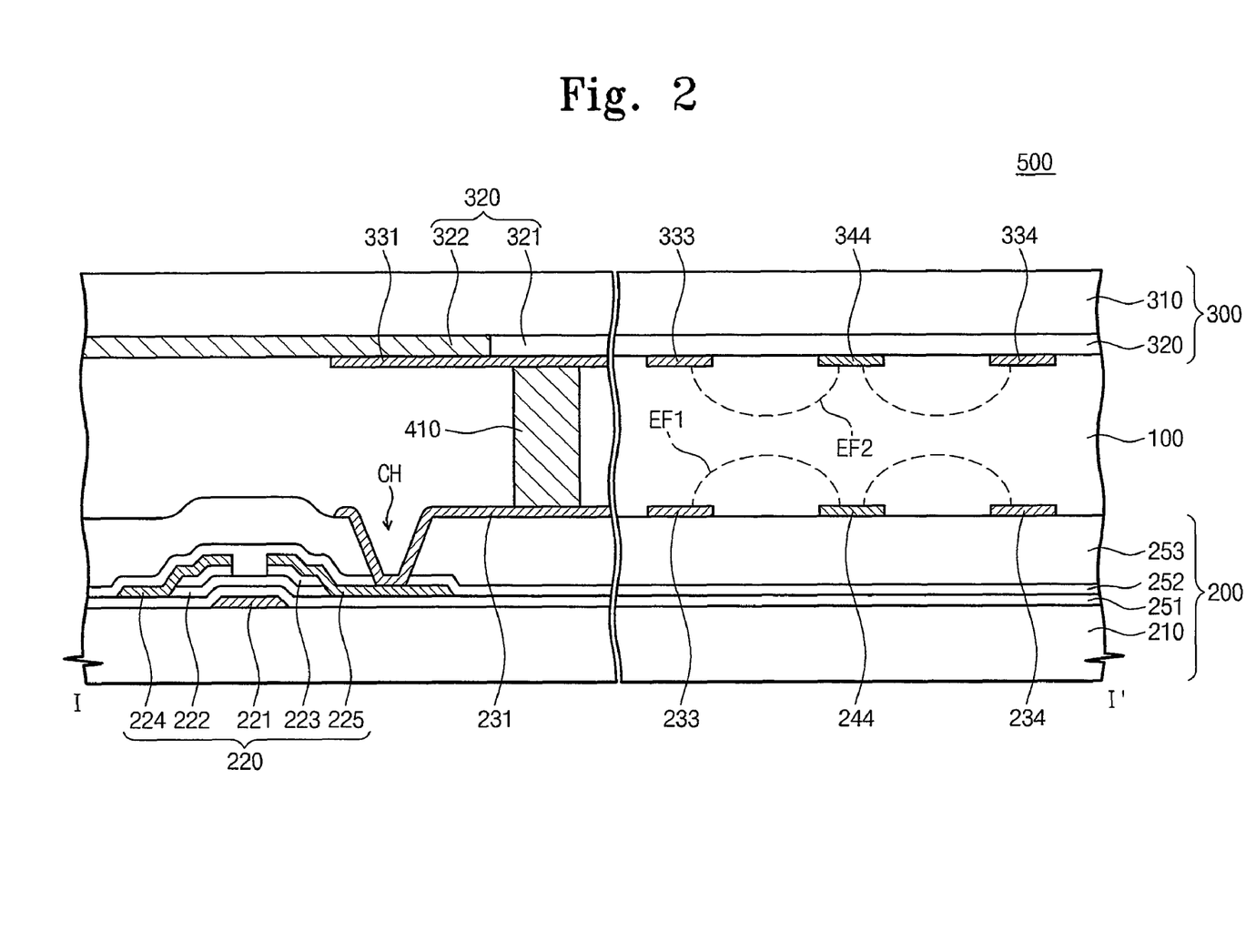
FIG. 2 is a cross-sectional view taken along line I-I' of FIG. 1.

FIG. 1 is a plan view showing an exemplary embodiment of a liquid crystal display panel according to the present invention, and FIG. 2 is a cross-sectional view taken along line I-I' of FIG. 1.

Referring to FIGS. 1 and 2, a liquid crystal display panel 500 includes a liquid crystal layer 100, an array substrate 200 arranged under the liquid crystal layer 100, and an opposite, or second, substrate 300 arranged above the liquid crystal layer 100.

The liquid crystal layer 300 controls a light transmittance thereof according to an electric field formed by a common voltage and a pixel voltage applied to the array substrate 200 and the opposite substrate 300, respectively. In the present exemplary embodiment, the liquid crystal layer 100 includes liquid crystals having a blue-phase that appears in a temperature region between a chiral nematic phase and an isotropic phase.

Figure 3:
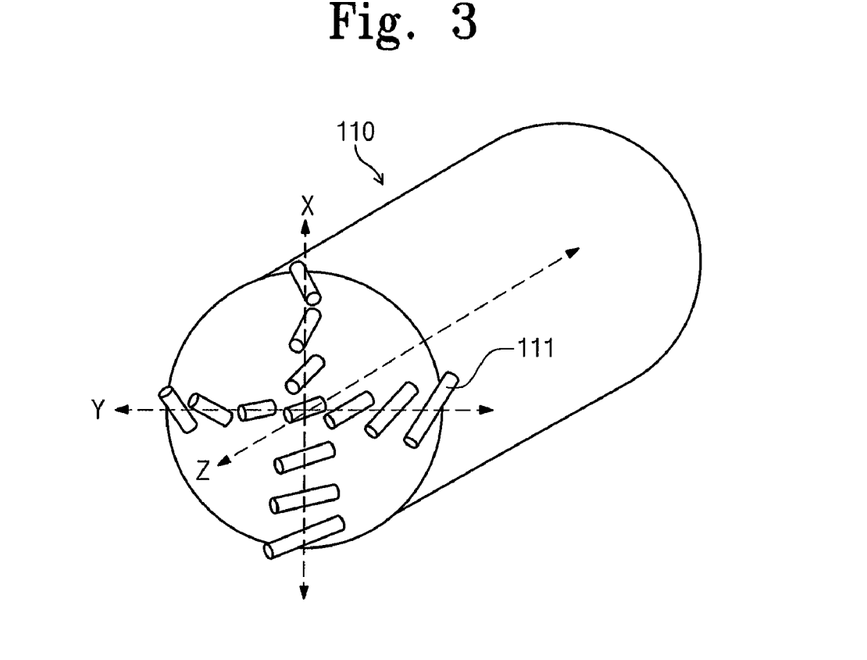
FIG. 3 is an enlarged perspective view showing the structure of a blue-phase liquid crystal.

FIG. 3 is an enlarged perspective view showing the structure of a blue-phase liquid crystal.

Referring to FIG. 3, the blue-phase liquid crystals are aligned to form a cylindrical shape, such an alignment of the blue-phase liquid crystals is defined as a double twist cylinder (DTC) 110 structure. The blue-phase liquid crystals are gradually twisted as they are spaced apart from a center axis (Z axis) of the DTC 110 and closed to an outer surface of the DTC 110. Particularly, the blue-phase liquid crystals are twisted along two twist axes (X axis and Y axis) substantially perpendicular to each other in the DTC 110. The blue-phase liquid crystals have directivity in the DTC 110 with respect to the center axis of the DTC 110.

The blue-phase is divided into three classes, such as a first blue-phase, a second blue-phase, and a third blue-phase, and the DTC 110 may have a variety of arrangement structures in accordance with the classes of the blue-phase.

Figure 4:
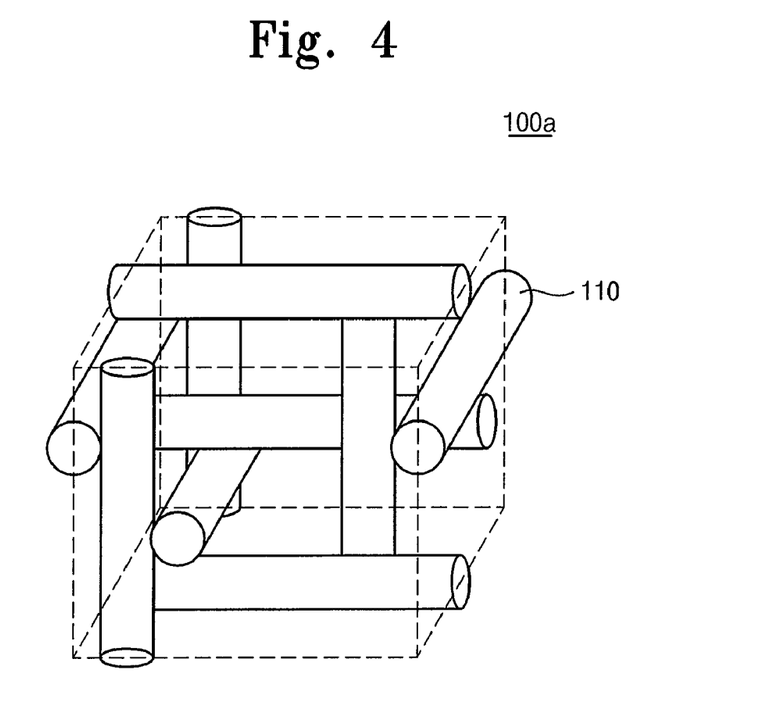
FIG. 4 is an enlarged perspective view showing the structure of a first blue-phase.
Figure 5:
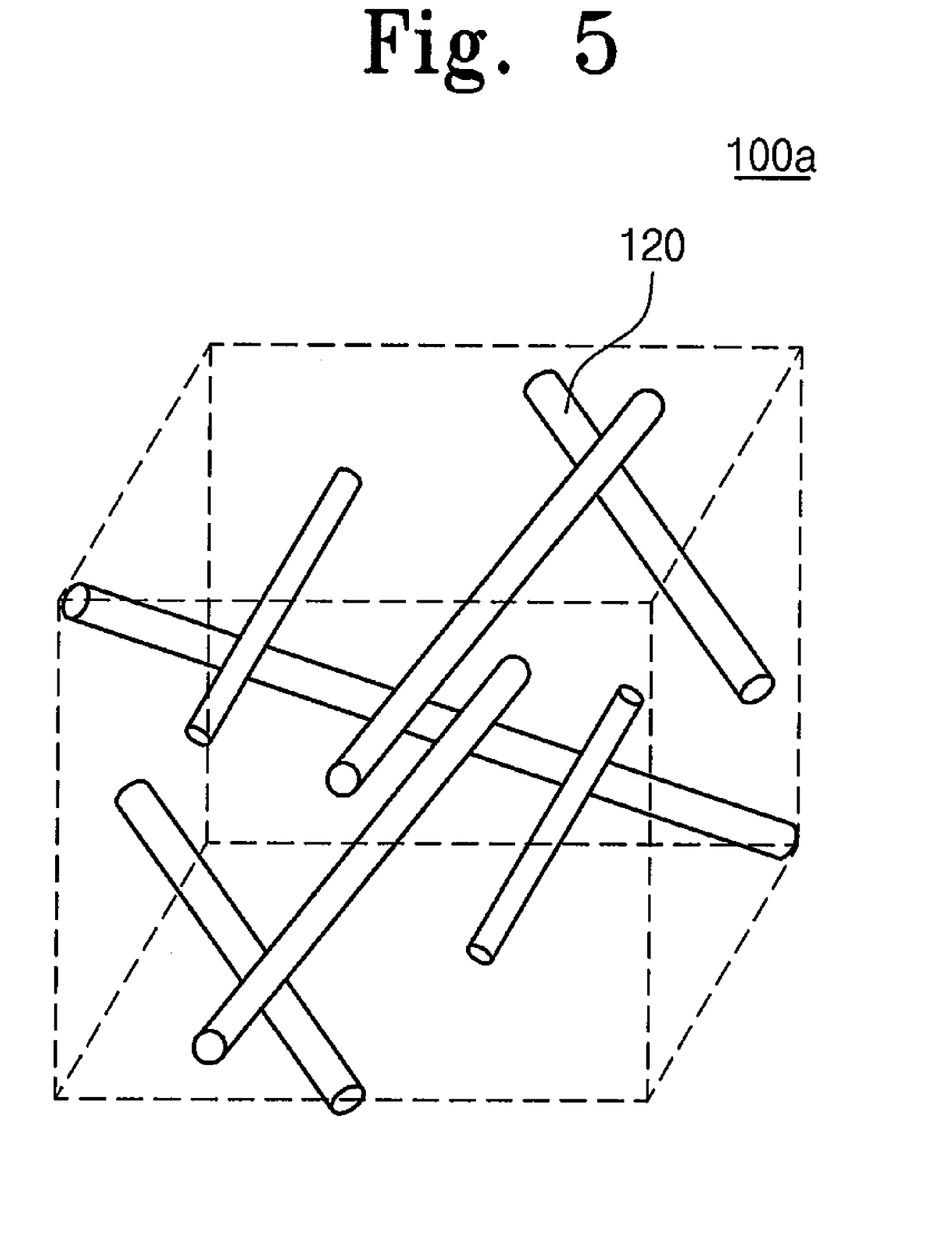
FIG. 5 is an enlarged perspective view showing a line defect of the first blue-phase in FIG. 4.

FIG. 4 is an enlarged perspective view showing a structure of a first blue-phase, and FIG. 5 is an enlarged perspective view showing a line defect of the first blue-phase in FIG. 4.

Referring to FIGS. 4 and 5, the DTCs 110 of the first blue-phase 100a are arranged to form a body-centered cubic lattice structure as one of lattice structures. Although not shown in FIGS. 4 and 5, the DTCs 110 of the second blue-phase are arranged to form a simple-cubic lattice structure. As the DTCs 110 are arranged in the lattice structure, disclination lines 120 occur in an area where adjacent three DTCs 110 are crossed with each other. This is because the liquid crystals are irregularly arranged without regular directivity in the area where the adjacent three DTCs 110 are crossed with each other.

In the present exemplary embodiment, the liquid crystal layer 100 (refer to FIG. 2) includes polymer-stabilized blue-phase liquid crystals stabilized by coupling to a polymer therewith. The polymer-stabilized blue-phase liquid crystals may stabilize the lattice structure of the DTCs 110 since the polymer is mixed therein. In detail, in case that the polymer is mixed in the blue-phase liquid crystals, the polymer is more easily coupled to the liquid crystals without the directivity included in the disclination lines 120 than the liquid crystals with the directivity included in the DTCs 110. When the disclination lines 120 are fixed by the polymer, the lattice structure of the DTCs 110 is stabilized, so that a temperature range between which the blue-phase liquid crystals appear may be expanded from 1° C.~5° C. to 1° C.~60° C.

The anisotropic refractive index of the blue-phase liquid crystals is varied in proportion to a square of a voltage applied thereto. As described above, in case that a voltage is applied to an isotropic substance having a polarity, such an optical effect in which the refractive index increases in proportion to the square of the voltage is defined as a Kerr effect. The liquid crystal display panel 500 adopting the blue-phase liquid crystals displays an image using the Kerr effect, thereby improving response speed of the liquid crystal display panel 500. Also, the refractive index of the blue-phase liquid crystals depends on a magnitude of the electric field applied to the blue-phase liquid crystals. Therefore, when the electric field has a uniform magnitude, the liquid crystal display panel 500 may have a uniform brightness regardless of cell-gap variation, and thus a display quality of the liquid crystal display panel 500 may be improved. In addition, the blue-phase liquid crystals do not need to be aligned, so that an alignment layer used to align the liquid crystals may be removed in the liquid crystal display panel 500.

Again referring to FIGS. 1 and 2, the array substrate 200 includes a first base substrate 210, a data line DL, a gate line GL, a thin film transistor 220, a first pixel electrode 230, and a first common electrode 240.

At least one pixel area PA in which an image is displayed is provided on the first base substrate 210 in an array configuration. The gate line GL is extended in a first direction D1 while being formed on an upper surface of the first base substrate 210 and receives a gate signal. The data line DL1 is extended in a second direction D2 substantially perpendicular to the first direction D1 and receives a pixel voltage. The data line DL1 is intersected with and insulated from the gate line GL, and defines the pixel areas PA with the gate line GL.

The thin film transistor 220 is arranged in the pixel area PA and switches the pixel voltage in response to the gate signal. More specifically, the thin film transistor 220 includes a gate electrode 221 branched from the gate line GL, an active layer 222 and an ohmic contact layer 223 sequentially arranged above the gate electrode 221, a source electrode 224 branched from the data line DL and arranged on the ohmic contact layer 223, and a drain electrode 225 arranged on the ohmic contact layer 223.

The first pixel electrode 230 is arranged in the pixel area PA and includes a transparent conductive material such as Indium Tin Oxide (ITO) or Indium Zinc Oxide (IZO). The first pixel electrode 230 is electrically connected to the drain electrode 225 and receives the pixel voltage via the drain electrode 225.

The first pixel electrode 230 includes a main pixel electrode 231 extended in the first direction D1, and first, second and third sub-pixel electrodes 232, 233, 234 branched from the main pixel electrode 231. In the present exemplary embodiment, the first pixel electrode 230 includes three sub-pixel electrodes 232, 233, 234, but the number of the sub-pixel electrodes 232, 233, 234 may be increased or decreased.

The main pixel electrode 231 is arranged adjacent to the gate line GL. The first to third sub-pixel electrodes 232, 233, 234 are extended in the second direction D2 and arranged in parallel with the data line DL. The first to third sub-pixel electrodes 232, 233, 234 are spaced apart from each other in the first direction D1. Also, the first to third sub-pixel electrodes 232, 233, 234 have a substantially same width, and the width of each of the first to third sub-pixel electrodes 232, 233, 234 is substantially equal to the width of the main pixel electrode 231.

In FIGS. 1 and 2, the drain electrode 225 is electrically connected to the main pixel electrode 231, but the drain electrode 225 may be electrically connected to at least one of the first, second and third sub-pixel electrodes 232, 233, 234 according to a shape and an arrangement structure of the first pixel electrode 230.

The first common electrode 240 is arranged in the pixel area PA and receives a common voltage. The first common electrode 240 is spaced apart from the first pixel electrode 230. In the present exemplary embodiment, the first common electrode 240 includes a same material as the first pixel electrode 230. The first common electrode 240 includes a main common electrode 241 extended in the first direction D1, first, second and third sub-common electrodes 242, 243, 244 branched from the main common electrode 241. The first common electrode 240 includes three sub-common electrodes 242, 243, 244, but the number of the sub-common electrodes 242, 243, 244 may be increased or decreased.

The main common electrode 241 is arranged at an opposite side to the main pixel electrode 231 of the first pixel electrode 230. The main common electrode 241 has a same width as that of the main pixel electrode 231. Also, the first to third sub-common electrodes 242, 243, 244 are extended in the second direction D2 and spaced apart from each other in the first direction D1. The first to third sub-common electrodes 242, 243, 244 have a substantially same width, and the width of each of the first to third sub-common electrodes 242, 243, 244 is substantially equal to the width of the main common electrode 241.

The first to third sub-common electrodes 242, 243, 244 are alternately arranged with the first to third sub-pixel electrode 232, 233, 234. For example, the first sub-common electrode 242, the first sub-pixel electrode 232, the second sub-common electrode 243, the second sub-pixel electrode 233, the third sub-common electrode 244, and the third pixel electrode 234 are sequentially arranged in the first direction D1.

In the present exemplary embodiment, the first pixel electrode 230 and the first common electrode 240 are spaced apart from each other by a distance that is substantially equal to the width of the first to third sub-pixel electrodes 232, 233, 234 or the width of the first to third sub-common electrodes 242, 243, 244. For instance, the second sub-pixel electrode 232 and the second common electrode 242 adjacent to each other have a substantially same width, and are spaced apart from each other by a distance that is substantially equal to the width of the second pixel electrode 232 or the width of the second common electrode 242.

The array substrate 200 further includes a common voltage line CL arranged on the upper surface of the first base substrate 210. The common voltage line CL is extended in the first direction D1 and transmits the common voltage to the first common electrode 240. When viewed in a plan view, the common voltage line CL is partially overlapped with the main common electrode 241 of the first common electrode 240, and electrically connected to the main common electrode 241 to apply the common voltage to the main common electrode 241.

Also, the array substrate 100 further includes a gate insulation layer 251, a passivation layer 252, and an organic insulation layer 253. The gate insulation layer 251 is arranged on the upper surface of the first base substrate 210 to cover the gate line GL, the gate electrode 221, and the common voltage line CL. The passivation layer 252 is arranged above the gate insulation layer 251 to cover the data line DL, the source electrode 224, and the drain electrode 225. The organic insulation layer 253 is arranged above the passivation layer 252, and the first pixel electrode 230 and the first common electrode 240 are arranged on an upper surface of the organic insulation layer 253.

The passivation layer 252 and the organic insulation layer 253 are provided with a contact hole CH formed therethrough to partially expose the drain electrode 225, and the first pixel electrode 230 is electrically connected to the drain electrode 225 via the contact hole CH.

The gate insulation layer 251, the passivation layer 252, and the organic insulation layer 253 are provided with at least one via hole VH formed therethrough to partially expose the common voltage line CL. The first common electrode 240 is electrically connected to the common voltage line CL through the via hole VH.

The array substrate 200 faces the opposite substrate 300, and the liquid crystal layer 100 is interposed between the array substrate 200 and the opposite substrate 300. The opposite substrate 300 includes a second base substrate 310, a color filter layer 320, a second pixel electrode 330, and a second common electrode 340.

The second base substrate 310 is coupled to the first base substrate 210 while facing the first base substrate 210. The color filter layer 320 is arranged on an upper surface of the second base substrate 310 and includes a color filter 321 and a black matrix 322. The color filter 321 is arranged in the pixel area PA and displays a predetermined color using a light supplied through the liquid crystal layer 100. The black matrix 322 is arranged around the color filter 321 to block the light.

Figure 6:
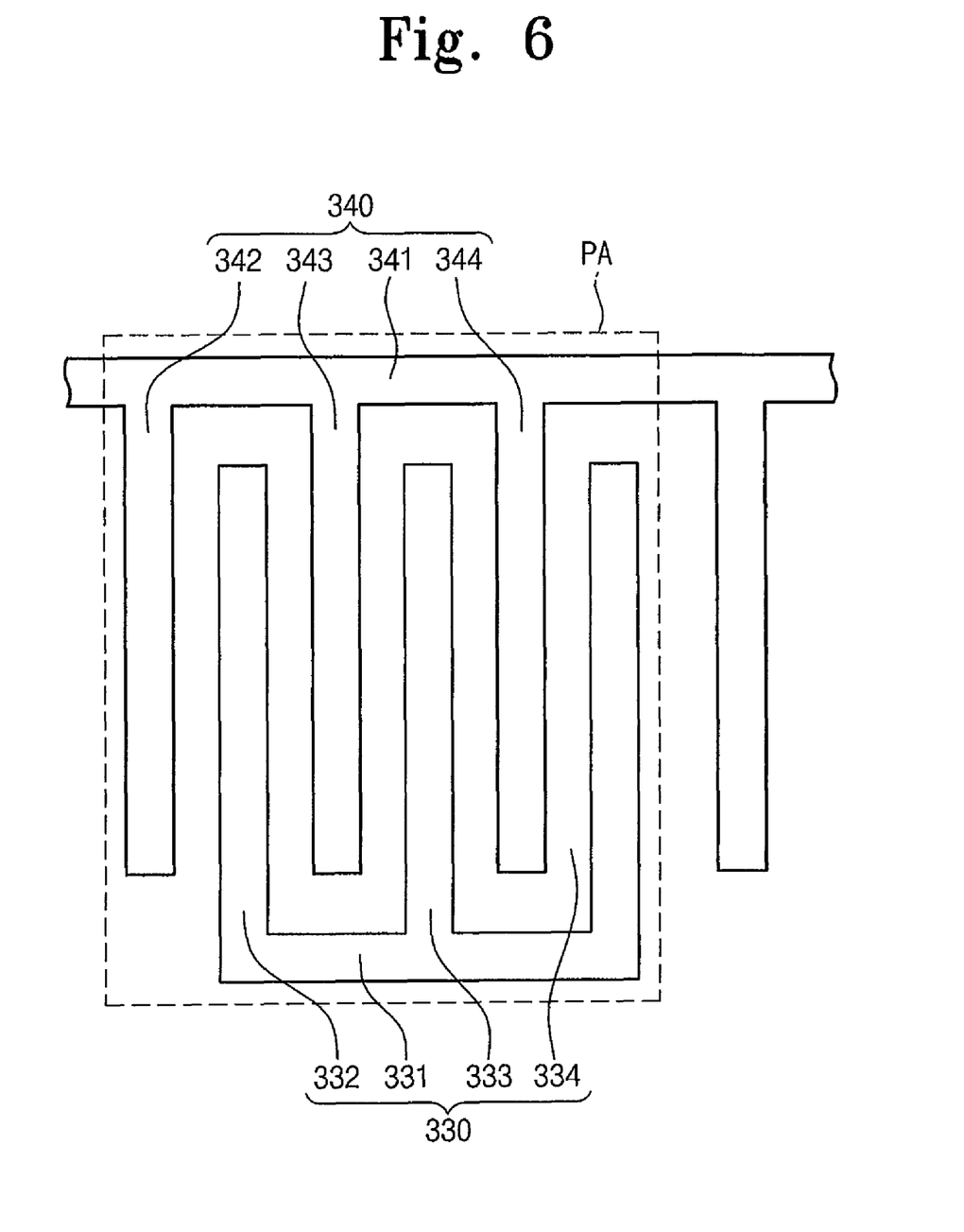
FIG. 6 is a plan view showing a second pixel electrode and a second common electrode in FIG. 2.
Figure 7:
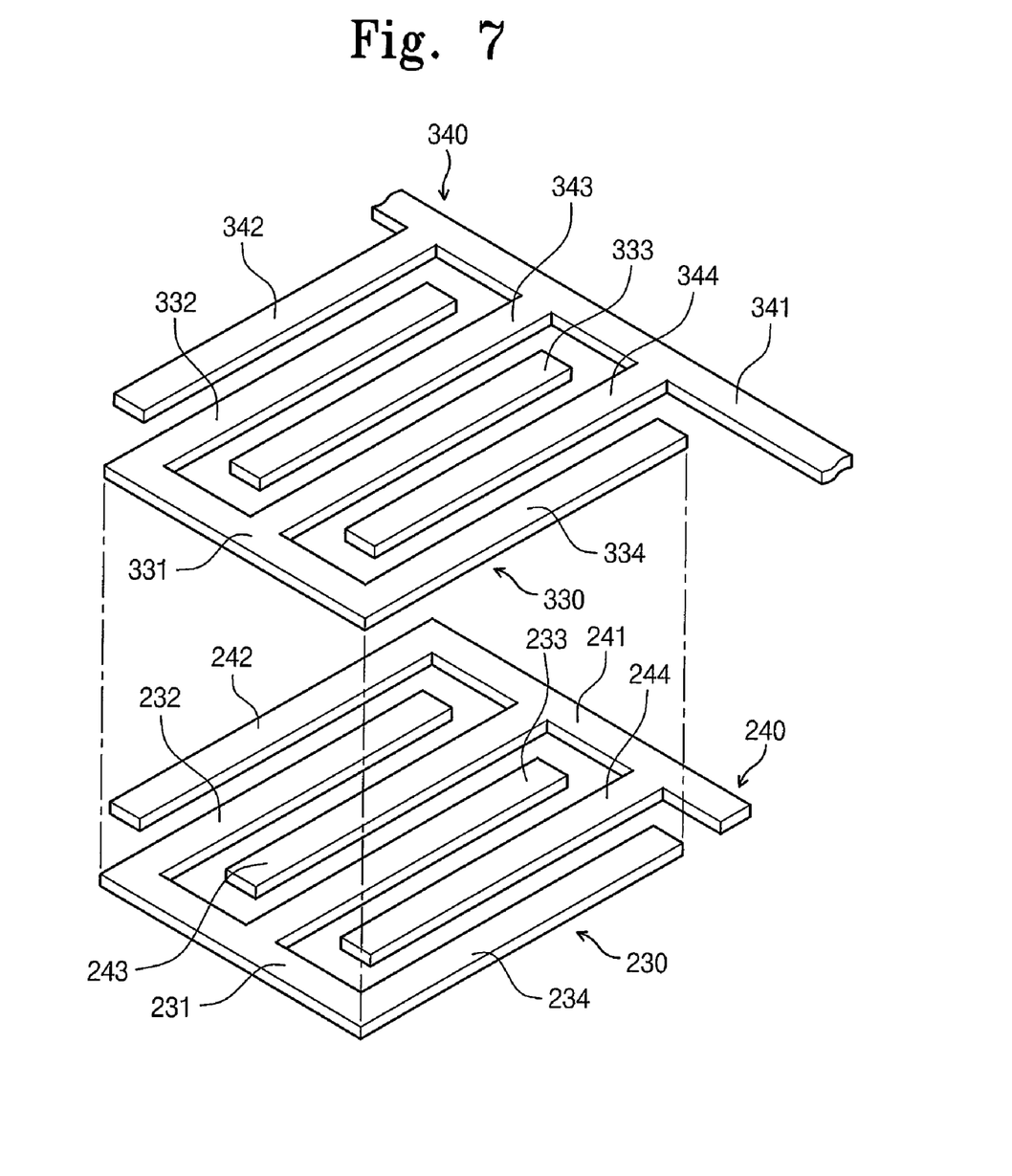
FIG. 7 is an exploded perspective view showing the positional relationship between the first pixel electrode and the second pixel electrode, and between the first common electrode and the second common electrode in FIG. 2.

FIG. 6 is a plan view showing the second pixel electrode and the second common electrode in FIG. 2, and FIG. 7 is an enlarged perspective view showing a position relationship between the first and second pixel electrodes, and between the first and second common electrodes in FIG. 2.

Referring to FIGS. 2 and 6, the second pixel electrode 330 and the second common electrode 340 are arranged on an upper surface of the color filter layer 320. The second pixel electrode 330 includes the transparent conductive material such as ITO or IZO and receives the pixel voltage from the first pixel electrode 230.

Referring to FIGS. 2 and 7, the second pixel electrode 330 is arranged in an area corresponding to the first pixel electrode 230 and overlaps with the first pixel electrode 230. The second pixel electrode 330 has a same shape as the first pixel electrode 230. Since the second pixel electrode 330 has a same structure as the first pixel electrode 230, a detailed description of the structure of the second pixel electrode 330 is unnecessary.

Main pixel electrode 331 of the second pixel electrode 330 has substantially the same width as the main pixel electrode 231 of the first pixel electrode 230. First, second and third sub-pixel electrodes 332, 333, 334 of the second pixel electrode 330 have a substantially same width as the first, second and third sub-pixel electrodes 232, 233, 234 of the first pixel electrode 230, respectively.

Referring to FIGS. 6 and 7, the second common electrode 340 includes the transparent conductive material such as ITO or IZO and receives the common voltage. The second common electrode 340 is arranged in an area corresponding to the first common electrode 240 of the pixel area PA and overlaps with the first common electrode 240. The second common electrode 340 has the same shape as the first common electrode 240. The second common electrode 340 also has a same structure as the first common electrode 240, and thus a detailed description of the structure of the second common electrode 340 is not required.

The first common electrodes arranged in the pixel areas are insulated from each other, but the second common electrodes arranged in the pixel areas are electrically connected to each other. That is, the main pixel electrodes of the first pixel electrodes respectively arranged in two pixel areas adjacent to each other are spaced apart from each other. On the contrary, the main common electrodes of the second pixel electrodes respectively arranged in two pixel areas adjacent to each other are electrically connected to each other.

The main common electrode 341 of the second common electrode 340 is arranged at the opposite side to the main pixel electrode 331 of the second pixel electrode 330 and has a substantially same width as the main common electrode 241 of the first common electrode 240. First, second and third sub-common electrodes 342, 343 and 344 of the second common electrode 340 and the first, second and third sub-pixel electrodes 332, 333 and 334 of the second pixel electrode 330 are arranged between the main common electrode 341 of the second common electrode 340 and the main pixel electrode 331 of the second pixel electrode 330. The first, second and third sub-common electrodes 342, 343 and 344 have a substantially same width as the first, second and third sub-common electrodes 242, 243 and 244 of the first common electrode 240, respectively.

The first, second and third sub-common electrodes 342, 343 and 344 of the second common electrode 340 are alternately arranged with the first, second and third sub-pixel electrode 332, 333 and 334 of the second pixel electrode 330. A distance between the second common electrode 340 and the second pixel electrode 330 is substantially equal to a distance between the first common electrode 240 and the first pixel electrode 230.

In the liquid crystal display panel 500, a first electric field EF1 is formed between the first pixel electrode 230 and the first common electrode 240, and a second electric field EF2 is formed between the second pixel electrode 330 and the second common electrode 340. Therefore, the first electric field EF1 and the second electric field EF2 are formed in a same area. Also, an intensity of the first electric field EF1 is defined by the pixel voltage applied to the first pixel electrode 230 and the common voltage applied to the first common electrode 240, and an intensity of the second electric field EF2 is defined by the pixel voltage applied to the second pixel electrode 330 and the common voltage applied to the second common electrode 340. Thus, the first electric field EF1 and the second electric field EF2 have a same intensity.

The anisotropic refractive index of the blue-phase liquid crystals included in the liquid crystal layer 100 is varied in accordance with the intensities of the first and second electric fields EF1 and EF2, so that the light transmittance of the liquid crystal layer 100 is controlled. Especially, the anisotropic refractive index of the blue-phase liquid crystals adjacent to the array substrate 200 is varied by the first electric field EF1, and the anisotropic refractive index of the blue-phase liquid crystals adjacent to the opposite substrate 300 is varied by the second electric field EF2.

As the above description, in the liquid crystal display panel 500, the anisotropic refractive index of the blue-phase liquid crystals is controlled by two electric fields EF1 and EF2, and thus a voltage applied to control the anisotropic refractive index of the blue-phase liquid crystals may be lowered. Therefore, a driving voltage of the liquid crystal display panel 500 may be reduced. Further, as the blue-phase liquid crystals arranged in the pixel area PA are positioned in an area affected by the first electric field EF1 or the second electric field EF2, the anisotropic refractive index of the blue-phase liquid crystals may be easily controlled, thereby improving a display quality of the liquid crystal display panel 500.

The liquid crystal display panel 500 further includes a conductive spacer 410 interposed between the first pixel electrode 230 and the second pixel electrode 330. The conductive spacer 410 electrically connects the first pixel electrode 230 to the second pixel electrode 330 and supplies the pixel voltage applied to the first pixel electrode 230 to the second pixel electrode 330. In FIG. 2, the conductive spacer 410 is interposed between the main pixel electrode 231 of the first pixel electrode 230 and the main pixel electrode 331 of the second pixel electrode 330. However, the conductive spacer 410 may be interposed between one sub electrode among the first, second and third sub-pixel electrodes 232, 233, 234 of the first pixel electrode 230 and one sub electrodes among the first, second and third 332, 333 and 334 of the second pixel electrode 330, which is corresponding to the one sub electrode of the first pixel electrode 230.

According to the above, each of the array substrate and the opposite substrate include the pixel electrode receiving the pixel voltage and the common electrode receiving the common voltage. Therefore, a horizontal electric field controlling the liquid crystal layer is formed in uniform intensity between the array substrate and the opposite substrate. As a result, the driving voltage of the liquid crystal display panel may be reduced, the refractive index of the liquid crystal layer may be easily controlled, and the display quality of the liquid crystal display panel may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display panel comprising:
    an array substrate comprising:
        a first substrate on which a pixel area displaying an image is defined;
        a first pixel electrode being arranged in the pixel area to receive a pixel voltage; and
        a first common electrode being arranged in the pixel area and spaced apart from the first pixel electrode to receive a common voltage and form a first electric field together with the first pixel electrode;
    an opposite substrate comprising:
    a second substrate facing the first substrate;
    a second pixel electrode being arranged on the second substrate corresponding to the pixel area to receive the pixel voltage; and
    a second common electrode being arranged on the second substrate corresponding to the pixel area and spaced apart from the second pixel electrode to receive the common voltage and form a second electric field together with the second pixel electrode; and
    a liquid crystal layer interposed between the array substrate and the opposite substrate,
    wherein the liquid crystal layer comprises blue-phase liquid crystals, an anisotropic refractive index of the blue-phase liquid crystals adjacent to the array substrate is varied by the first electric field, and an anisotropic refractive index of the blue-phase liquid crystals adjacent to the opposite substrate is varied by the second electric field.

2. The liquid crystal display panel of claim 1, further comprising a conductive spacer interposed between the first pixel electrode and the second pixel electrode to connect the first pixel electrode to the second pixel electrode.

3. The liquid crystal display panel of claim 1, wherein the second pixel electrode is arranged in an area corresponding to the first pixel electrode.

4. The liquid crystal display panel of claim 3, wherein the first pixel electrode comprises:

a main pixel electrode extending in a first direction; and
a plurality of sub-pixel electrodes branching from the main pixel electrode and extending in a second direction different from the first direction, and the sub-pixel electrodes being spaced apart from each other.

5. The liquid crystal display panel of claim 4, wherein the second pixel electrode and the first pixel electrode have a common shape.

6. The liquid crystal display panel of claim 1, wherein the second common electrode is arranged in an area corresponding to the first common electrode.

7. The liquid crystal display panel of claim 6, wherein the first common electrode comprises:
    a main common electrode facing the main pixel electrode and extending in the first direction; and
    a plurality of spaced apart sub-common electrodes branching from the main common electrode and extending in the second direction.

8. The liquid crystal display panel of claim 7, wherein the sub-pixel electrodes and the sub-common electrodes are alternately arranged.

9. The liquid crystal display panel of claim 8, wherein each of the sub-pixel electrodes has a first width, each of the sub-common electrodes has a second width, and the sub-pixel electrode and the sub-common electrode that are adjacent to each other are spaced apart from each other by a distance substantially equal to the first width or the second width.

10. The liquid crystal display panel of claim 9, wherein the second width is substantially equal to the first width.

11. The liquid crystal display panel of claim 1, wherein the array substrate further comprises:
    a gate line receiving a gate signal, the gate line being arranged on the first base substrate;
    a data line receiving a pixel voltage, the data line being intersected with the gate line and insulated from the gate line to define the pixel area; and
    a switching device arranged in the pixel area, the switching device being electrically connected to the gate line, the data line, and the first pixel electrode.

12. The liquid crystal display panel of claim 11, wherein the array substrate further comprises a common voltage line extended in parallel with the gate line and electrically connected to the first common electrode to transmit the common voltage to the first common electrode.

13. The liquid crystal display panel of claim 1, wherein liquid crystals of the liquid crystal layer have a characteristic where an isotropic refractive index is changed into an anisotropic refractive index in accordance with a first electric field and a second electric field.

14. The liquid crystal display of claim 1, wherein the opposite substrate further comprises color filters.

15. The liquid crystal display of claim 1, wherein the first pixel electrode, first common electrode, second pixel electrode and second common electrode are transparent.

* * * * *